United States Patent
Stählin et al.

(10) Patent No.: US 8,838,383 B2
(45) Date of Patent: Sep. 16, 2014

(54) VEHICLE ANTENNA UNIT

(75) Inventors: Ulrich Stählin, Eschborn (DE); Marc Menzel, Weimar/Lahn (DE); Martin Schürmeier, Regensburg (DE)

(73) Assignees: Continental Teves AG & Co., OHG (DE); ADC Automotive Distance Control Systems GmbH (DE)

( * ) Notice: Subject to any disclaimer, the term of this patent is extended or adjusted under 35 U.S.C. 154(b) by 0 days.

(21) Appl. No.: 13/375,958

(22) PCT Filed: May 28, 2010

(86) PCT No.: PCT/EP2010/057504
§ 371 (c)(1),
(2), (4) Date: Jun. 6, 2012

(87) PCT Pub. No.: WO2010/149467
PCT Pub. Date: Dec. 29, 2010

(65) Prior Publication Data
US 2012/0239294 A1    Sep. 20, 2012

(30) Foreign Application Priority Data
Jun. 5, 2009   (DE) .................. 10 2009 026 786

(51) Int. Cl.
*G01C 21/00*   (2006.01)
*G08G 1/16*    (2006.01)
*H04L 29/08*   (2006.01)

(52) U.S. Cl.
CPC .............. *G08G 1/161* (2013.01); *H04L 67/12* (2013.01)
USPC ........................................................ 701/484

(58) Field of Classification Search
CPC ................. H04L 67/12; G08G 1/161
USPC ........................................................ 701/484
See application file for complete search history.

(56) References Cited

U.S. PATENT DOCUMENTS 6,871,144 B1 *   3/2005   Lee ................. 701/411
7,783,423 B2 *   8/2010   Verma et al. ............ 701/469

(Continued)

FOREIGN PATENT DOCUMENTS

CN      1606258 A       4/2005
CN      101410881 A     4/2009

(Continued)

OTHER PUBLICATIONS

Gallagher at al , "Wireless Communication for vehicle safety: Radio link performance and wireless connectivity methods", IEEE, US, vol. 1, No. 4, Dec. 1, 2006, XP011176537, ISSN: 1556-6072.*

(Continued)

*Primary Examiner* — Fadey Jabr
*Assistant Examiner* — Yazan A Soofi
(74) *Attorney, Agent, or Firm* — RatnerPrestia

(57) ABSTRACT

A vehicle antenna unit for participation in vehicle-to-surroundings communication in accordance with the DSRC or ITS-G5 standard having an adhoc network antenna for sending and receiving in the region of 5.9 GHz, having a satellite antenna for receiving satellite locating signals and having driver elements, which are set up to send, bit by bit, and/or to receive data with the adhoc network antenna and the satellite antenna, and having a computation unit for conditioning the data. In order to allow the vehicle to participate in the vehicle-to-surroundings communication, the computation unit is set up to evaluate the satellite locating signals and for the purpose of independent participation by the vehicle antenna unit in the vehicle-to-surroundings communication.

9 Claims, 2 Drawing Sheets

(56) References Cited

U.S. PATENT DOCUMENTS

2007/0083318 A1* 4/2007 Parikh .................... 701/96
2011/0071756 A1 3/2011 Stählin

FOREIGN PATENT DOCUMENTS

| DE | 102005029662 A1 | 1/2006 |
| DE | 102008012654 A1 | 3/2009 |
| EP | 1523130 A2 | 4/2005 |
| EP | 2001001 A2 | 12/2008 |

OTHER PUBLICATIONS

Gallagher, Brian, "Wireless Communications for Vehicle Safety: Radio Link Performance and Wireless Connectivity Methods", IEEE, Vehicular Technology Magazine, IEEE, vol. 1, No. 4, (Dec. 1, 2006), 4-24.

Morioka, Y., "An Anti-Carcollision System Using GPS and 5.8GHz Inter-Vehicle Communication at an Off-Sight Intersection", Vehicular Technology Conference, IEEE VTS, vol. 5, Fall VTC 2000. 52nd Sep. 24-28, 2000, 2019-2024.

Yasuhiro, Sato, "Vehicular Collision Avoidance Support System v2 (VCASSv2) by GPS+INS Hybrid Vehicular Positioning Method", Telecommunication Networks and Applications Conference, ATNAC 2007, Australiasia, IEEE, (Dec. 2, 2007), 29-34.

International Application Serial No. PCT/EP2010/057504, International Search Report mailed Dec. 3, 2010, 6 pgs.

Chinese Office Action regarding Chinese Patent Application No. 2010800345967, dated Dec. 13, 2013.

* cited by examiner

VEHICLE ANTENNA UNIT

CROSS REFERENCE TO RELATED APPLICATIONS

This application is the U.S. National Phase Application of PCT International Application No. PCT/EP2010/057504, filed May 28, 2010, which claims priority to German Patent Application No. 10 2009 026 786.7, filed Jun. 5, 2009, the contents of such applications being incorporated by reference herein.

FIELD OF THE INVENTION

The invention relates to a vehicle antenna unit for participation in vehicle-to-vehicle-surroundings communication (C2X), particularly vehicle-to-vehicle (C2C) and vehicle-to-infrastructure (C2I) communication, subsequently referred to in summary as C2X communication, in accordance with the DSRC or ITS-G5 standard, particularly on the basis of the IEEE 802.11p protocol. The vehicle antenna unit has an adhoc network antenna for sending and receiving signals in the region of 5.9 GHz and also a satellite antenna for receiving satellite locating signals, for example from the GPS, Galileo or another satellite-based locating system. In addition, the vehicle antenna unit contains driver elements which are associated with the respective antenna and which are set up to send and/or receive data or signals with the adhoc network antenna and the satellite antennas. Particularly the driver elements of the adhoc network antenna may be provided for the purpose of sending and receiving data bit by bit. These driver elements may be implemented as hardware and/or software in a computation unit of the antenna unit and, for the C2X communication, may meet particularly the requirements of the bottommost layer (physical layer) of the C2X communication protocol stack, i.e. particularly the setup and maintenance of a physical connection to the adhoc network at the prescribed transmission frequency and the bit-by-bit transmission (sending and receiving) of data records. For the purpose of conditioning and communication control of the data, a computation unit is also provided in the vehicle antenna unit, said computation unit preferably also having the software for the communication stack (communication protocol stack), as a result of which the vehicle antenna unit has particularly only one vehicle unit for reasons of cost.

BACKGROUND OF THE INVENTION

Vehicle antenna units having a plurality of antennas are known, since the vehicles are typically equipped with different telematics functions, such as mobile telephone, radio, satellite locating and the like. Within the context of the currently developing vehicle-to-vehicle or vehicle-to-infrastructure communication (C2X), antenna devices are also being developed which are set up for the data transmission in accordance with IEEE 802.11p which is called DSRC or else ITS-25.

In addition, antennas are already being developed which also contain transceivers and in some cases further electronics in physical proximity or directly integrated in the antenna. In this regard, reference is made to DE 198 43 664 A1, which is incorporated herein, for example, which has a communication system having a communication device which comprises an antenna and which accommodates suitable electronic devices for carrying out CDMA communication. However, the antenna unit shown therein is neither set up to carry out different types of communication nor able to control the communication. For carrying out the communication, it is instead reliant on further vehicle units providing the data intended for transmission and controlling the communication.

SUMMARY OF THE INVENTION

In order to facilitate the introduction of C2X communication and to ensure adequate network node density in the traffic, the present invention proposes an inexpensive network node for participation in the C2X communication within the context of an adhoc network.

This is achieved by means of the a vehicle antenna unit for participation in vehicle-to-surroundings communication in accordance with the DSRC or ITS-G5 standard having an adhoc network antenna for sending and receiving in the region of 5.9 GHz, having a satellite antenna for receiving satellite locating signals and having driver elements, which are set up to send and/or receive using the adhoc network antenna and the satellite antenna, and having a computation unit for conditioning the data, wherein the computation unit is set up to evaluate the satellite locating signals and for the purpose of independent participation by the vehicle antenna unit in the vehicle-to-surroundings communication. To this end, a vehicle antenna unit of the type cited at the outset has particular provision for the computation unit to be set up to evaluate the satellite locating signals and for the purpose of independent participation by the antenna unit in the vehicle-to-surroundings communication particularly in accordance with the DSRC or ITS-G5 standard on the basis of IEEE 802.11p. Independent participation is understood to mean participation in the C2X communication where all the processing steps of the C2X communication protocol stack are executed or can be executed by the computation unit of the vehicle antenna unit autonomously and without the need for access to data from other vehicle units provided by a vehicle-internal communication network. This does not exclude the antenna unit from having one or more connections to a vehicle-internal communication network and interchanging information with other vehicle units via this network. This information can, if appropriate, also be used in the C2X communication, for example when transmitting data relating to the individual vehicle position or relating to the display of hazard warnings in the vehicle. However, such information presupposes further vehicle units which are connected together with the vehicle antenna unit to the vehicle-internal communication network and provide and use this information. A crucial aspect within the context of the present invention, however, is that the vehicle antenna unit (subsequently also referred to just as antenna unit to simplify matters) also participates in the C2X communication totally autonomously, i.e. independently, irrespective of these possibly additionally connected vehicle units, and the computation unit of the vehicle antenna unit is set up to this end, irrespective of possibly further applications or functions which are set up in the computation unit.

Therefore, the computation unit is set up—according to aspects of the invention—to participate in the adhoc network radio communication independently, i.e. to receive, send and possibly forward data messages and possibly to transmit at least information about the vehicle position, the vehicle speed and the direction of travel. This information is both evaluated in terms of content by other communication subscribers in the course of C2X communication, for example in order to draw conclusions about the traffic situation or to indicate hazard situations, and used in the network switching for forwarding the data packets, since in the case of, an adhoc network the subscribers acting as network nodes in transmission range are not stationary, which means that the network has a different appearance at any time.

Therefore, the computation unit is preferably set up to ascertain the vehicle position, the vehicle speed and the direction of travel from received satellite locating signals, this information being able to be made available to the C2X communication protocol stack in order to organize the switching of data packets in the adhoc network. This organization typically takes place in what is known as the ITS network layer. It is therefore particularly advantageous if the computation unit is set up not only to provide the ascertained vehicle data (position, speed, direction) as transmittable data in a bit data stream, for example, but also to input the data directly into the ITS network layer on an internal interface of the computation unit. In the case of different, separate computation units the interface may naturally—in accordance with the invention— also be in the form of an interface between the different computation units. Possibly, these vehicle data which are input into the interface can be used not only for network switching but also directly as information data for the C2X communication in the data packets, without said data needing to be made available separately as information data, for example via the IST Facilities layer. It is thus possible to transmit the current position particularly quickly in a C2X communication.

In order to implement the actual communication (which takes place physically and is largely detached from the transmitted contents) in the course of the C2X communication, the computation unit may preferably be set up to perform the functions of the ITS Access layer, the ITS Network layer and the ITS Transport layer. When processing the C2X communication protocol stack within the context of the ITS (Intelligent Transportation System), these layers are responsible for successful communication by the different network subscribers and ensure that the data are distributed in the network as desired. These layers operate on the basis of prescribed standards, which can be retrieved on the internet at www.standards.its.dot.gov, which is incorporated by reference, for example. The computation unit is set up particularly for processing these standards.

The ITS Access layer, also called the ITS Access Technologies layer, has the requirements of the IEEE 802.11p protocol implemented in it, said protocol being based directly on the physical (bottommost) layer of the C2X communication protocol stack. It provides particularly the media access control (MAC), which is intended to ensure reliable transmission of the data with as few errors as possible. This is done by controlling particularly the physical access to the transmission medium (i.e. the adhoc network), splitting the bit data stream into blocks and allocating check and sequence numbers, which allow conclusions to be drawn as to channel loading and the integrity of the individual data packets, for example. Prioritization of particular data packets during the transmission can also be implemented in the ITS Access layer.

The task of the ITS Network layer is to organize the switching of the individual data packets between the constantly changing network nodes. This includes particularly the data transmission via the entire adhoc network from the transmitter (network node) to the receiver (network node) and hence the routing between the network nodes, for which network nodes the data packets within this network layer are provided with a new (intermediate) destination and forwarded to the next network node until they have reached their final destination (receiver network node).

One great challenge is the network topology that is constantly changing on account of the moving network nodes, both in respect of the network nodes participating in the communication and in respect of the situation of said network nodes. In order to ascertain the adjacent subscribers in the first place, the individual network nodes periodically emit what are known as beacon messages in order to make their presence felt in the network. The beacon messages can be provided at least with the position, and possibly also with a statement about the direction of movement and speed thereof. Each network node receives the beacon messages and enters them with the possibly contained position information and further information into a table which respectively provides information about the network nodes participating in the C2X communication.

Particularly for a unicast transmission to a selected subscriber or a uni/anycast transmission to a few selected subscribers, the forwarding of data messages (hopping or multihopping) by the network nodes is necessary. This can involve the use of intelligent mechanisms in which the data packets are not simply flooded, i.e. transmitted once or retransmitted a plurality of times by each receiving network node. On account of the position information which is currently known for each network node, it is possible to forward the data packets by selecting that network node which is closest to the destination. This speeds up the communication and helps to avoid congesting the network, since the data packets are forwarded in target-oriented fashion.

In the case of what is known as "Georouting", which is oriented to selected physical regions, it is the case that data need to be transmitted to vehicles in a particular geographical area, with all, some or a specific vehicle(s) being intended to be addressed by differently. In this case too, a hopping mechanism can be used, but where preferably that network node which is furthest away from the last transmitting network node retransmits the data message, in order to achieve the fastest possible propagation in the geographical area. For faster areal coverage, it is also possible for a plurality of network nodes to retransmit the data packets in each case, with preferably those network nodes which are furthest away from all of the last transmitting network nodes, for example the last two, three or four transmitting network nodes, performing a retransmission. To implement this transmission mode, the computation unit may—in accordance with the invention—be set up to store and manage the respective last transmitting network nodes with their positions at the time of the transmission in a list or the like. This list can be managed on the basis of the last in last out principle.

In addition, the ITS Network layer can apply a store-and-forward mechanism, which can be used to appropriate effect particularly when network node density is low. The network node density can be derived from the table of beacon messages. To apply this store-and-forward mechanism, the data packets are allocated explicit lives within which they are intended to be retransmitted. The transmission can additionally or alternatively also be coupled to a particular geographical area. When a vehicle receives a data packet for retransmission but there is no suitable network node for forwarding in its reception range, the data message can be buffer-stored until its life expires and/or the geographical area is left, and cannot be transmitted until a suitable communication partner (network node) ascertained by means of a beacon message, for example, appears.

The ITS Transport layer usually caters for segmentation of data packets and queue avoidance (congestion control). It is also the name of the ITS Transport layer to allow the subsequent, more application-oriented layers of the C2X communication protocol stack to effect uniform access without needing to take account of the exact properties of the physical communication network.

For logical reasons, the computation unit of a vehicle antenna unit according to aspects of the invention can also be set up to perform the basic functions of the ITS Facilities layer.

The ITS Facilities layer is the link between the lower layers of the C2X communication protocol stack, which are provided more for technical purposes for carrying out the communication, particularly the ITS Access layer, the ITS Network layer and the ITS Transport layer, and the higher, application-oriented layer of the C2X communication protocol stack, particularly the ITS Applications layer. The task of the ITS Facilities layer may particularly be the compilation (coding/decoding) of the data message contents and the evaluation of the received data message contents. However, the evaluation is preferably limited to such information as is typically used by a large number of applications, which means that it is favorable to preprocess the data and to make them available to the applications as information in accordance with the ITS standard. This includes particularly a map allocation for the different network nodes, i.e. particularly vehicles or infrastructure units, the compilation of direct notifications, for example explicit hazard warnings, or of a reports about current speed limits. Information evaluation limited thereto can be performed without great processor power, which means that, in accordance with the invention, it makes particular sense to implement these basic functions of the ITS Facilities layer in the computation unit of the vehicle antenna unit as well when the C2X communication protocol stack is executed if the aim is to provide an inexpensive vehicle antenna unit which participates in the C2X communication independently.

In accordance with one particular embodiment of the invention, it makes sense to set up the computation unit such that it—at least as far as the independent participation of the antenna unit in the C2X communication is concerned—is limited to the execution of the ITS Access layer, the ITS Network layer and the ITS Transport layer and also the ITS Facilities layer, particularly the latter (but possibly also all layers) preferably within the context of the functions described previously.

For the ITS Facilities layer, it is particularly advantageous if the information of interest to a large number of applications is made available in accordance with the ITS Standard. This can then be a logical interface for further applications, which can optionally also be covered by the vehicle antenna unit if required. However, in this connection, it is emphasized that this supplementary information is in fact not necessary for the antenna unit according to aspects of the invention to participate in the C2X communication independently, and the computation unit is set up such that independent participation without restrictions and error messages is also possible when the supplementary information is not available and/or not evaluated.

So as still to be able to use this supplementary information in the vehicle as an option, a higher-quality and hence more expensive vehicle antenna unit according to aspects of the invention may have a reading and/or outputting interface to other vehicle units. According to aspects of the invention, this interface may be of bidirectional design, but also just of unidirectional design in one or the other communication direction.

When such an interface, particularly a bidirectional interface, is present, the antenna unit may also have a cellular antenna (mobile radio antenna), for example, and/or be set up for normal WLAN communication, particularly on the basis of one of the IEEE 802.11.a/b/g standards. Other vehicle units can then use the interface to access the additional antenna functions, and possibly the satellite antenna, even if the connected vehicle units are not using the C2X communication, but rather the vehicle antenna unit is participating in the C2X communication independently, in accordance with the invention.

Such an antenna unit according to aspects of the invention can then be used as a basic antenna unit for vehicles with telematics functions and, furthermore, provides C2X communication which, in accordance with the invention, is independent, i.e. independent of the further vehicle units. Particularly when introducing the C2X communication, this helps to achieve an adequate network node density quickly without the need for the vehicles to be equipped with the very expensive C2X applications. Vehicle units having such C2X applications (from the ITS Applications layer) can then easily be upgraded, however, because the actual communication layers of the C2X communication protocol stack are already implemented in the vehicle. It is therefore particularly advantageous if the interface is a bus interface to an internal vehicle communication network and can communicate universally a with different vehicle units in the format of the vehicle bus (CAN, MOST or the like).

In accordance with one preferred embodiment of such a vehicle antenna unit according to aspects of the invention having an interface to the vehicle or to other vehicle units, the computation unit may be set up to filter the information extracted from the C2X communication and to use the interface as a data-outputting interface in order to output filtered information. This function of the computation unit can be understood as a specific application in an ITS Applications layer, but is limited to simply providing useable information in the vehicle. Therefore, in particular, no position data from other vehicles or network nodes are output via the interface, since said data usually require intensive post-processing or further processing in downstream vehicle units. In order to keep the system load in the vehicle as low as possible, it is therefore appropriate to filter only selected messages out of the C2X data stream or the information extracted therefrom and to make it available to the vehicle via the interface which is also operated only as a reading interface. Ideally, this is information which can be used directly for information, warnings or actions in the vehicle without further post-processing or at least with very little post-processing. Examples in this regard are speed limits which are received from an infrastructure unit (roadside unit RSU), similarly queue information from other vehicles or infrastructure units. By contrast, information which, taken individually, is still unable to trigger warnings or the like (such as a vehicle position which may be hazardous if they represent a vehicle approaching from the side at a junction) is, by contrast, not transmitted, in accordance with the invention, since these data require a high level of processing power in the individual vehicle in order to bring about appropriate information, warnings or actions. The information filtered out can also be selected, by way of example, such that it can be presented directly on a display of a man-machine interface, as is present in almost any vehicle.

In one further development of this inventive concept, the criteria for filtering the information extracted from the C2X communication may be prescribable and alterable particularly by software interventions and/or parameters, as a result of which the filters can be adjusted by means of software in order to allow alterations with time, for example if new messages are defined or new vehicle units with extended functions are installed in the vehicle. In this case, the antenna unit can thus be configured autonomously and automatically for the use of this new vehicle unit.

In addition, in accordance with another embodiment of the present invention, the computation unit may be set up to use the interface as a data reading interface in order to use sensor data which are output by a vehicle sensor unit having vehicle sensors for improved ascertainment of the individual vehicle position and to use this improved vehicle position in the C2X communication. This specific application may also be an application in the ITS Applications layer and is used for producing higher-quality data particularly for ITS applications in other vehicles. By contrast, the improved position statement for the individual vehicle has no significant effect on the performance of the actual communication during the C2X communication. For this case, the interface may also be exclusively in the form of a data reading interface.

In addition, the interface may also be set up to read inputs by the driver (e.g. activation of the blue light in an emergency vehicle or operation of the hazard warning lights or the like), either via dedicated connections or via appropriate messages on a vehicle bus. These data are then packed in the computation unit together with any necessary supplementary data as appropriate communication messages, and sent. The driver actions which can be read in are dependent on the messages supported, and hence on the applications supported.

In accordance with one preferred further development, the two aforementioned applications may also be combined in the computation unit, for which reason the interface is then in the form of a data outputting and data reading interface, that is to say a bidirectional interface. Particularly in the case of such a bidirectional interface, it is particularly advantageous for the vehicle antenna unit also to be equipped with a cellular antenna for communication with a public mobile radio network and/or with a WLAN antenna particularly for communication on the basis of the IEEE 802.11.a/b/g standard, each antenna having respectively associated driver elements which are set up to transmit and/or receive data bit by bit. Insofar as this is technically possible, it is possible to use individual antennas also with dual functions for use in different types of communication. The interface may be in the form of an interface to a vehicle bus, as a result of which other vehicle units in the vehicle can use the vehicle antenna unit comprehensively for all of their telematics functions.

The vehicle sensors for improvement when the vehicle's own position is ascertained may be sensors such as wheel speed sensors, steering angle sensors, yaw rate sensors or the like, which, in combination with the satellite locating signal, allow model-based improvement of the position.

The minimal variant described at the outset for the vehicle antenna unit with the opportunity for independent C2X communication is able to use just one system component, namely the intelligent vehicle antenna unit proposed in accordance with the invention, to equip or upgrade a vehicle inexpensively to produce a fully fledged member of the C2X communication. Such vehicle antenna units can be offered not only as initial equipment but also as upgrade solutions for vehicles which provide a substitute for previous antenna solutions, and in such a case it may also make sense to integrate all of the antennas and functions required for the vehicle telematics in addition to the independent C2X communication and to replace the previous individual vehicle antenna. Without these additional antennas and telematics functions, the vehicle antenna unit according to aspects of the invention can also be offered a very inexpensive upgrade solution and the individual vehicle antennas can be operated in parallel.

The vehicle antenna unit proposed according to aspects of the invention provides a system of low complexity which allows a vehicle to participate in C2X communication. This significantly improves the acceptance and equipment of the vehicles for participation in the C2X communication, which will result in rapid implementation of the system in practice. In addition, this proposed antenna unit can be used, in accordance with the invention, as a consistent concept for use in small cars through to top of the range and commercial vehicles, since the proposed vehicle antenna unit can be extended flexibly by further functions from the ITS Applications layer.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
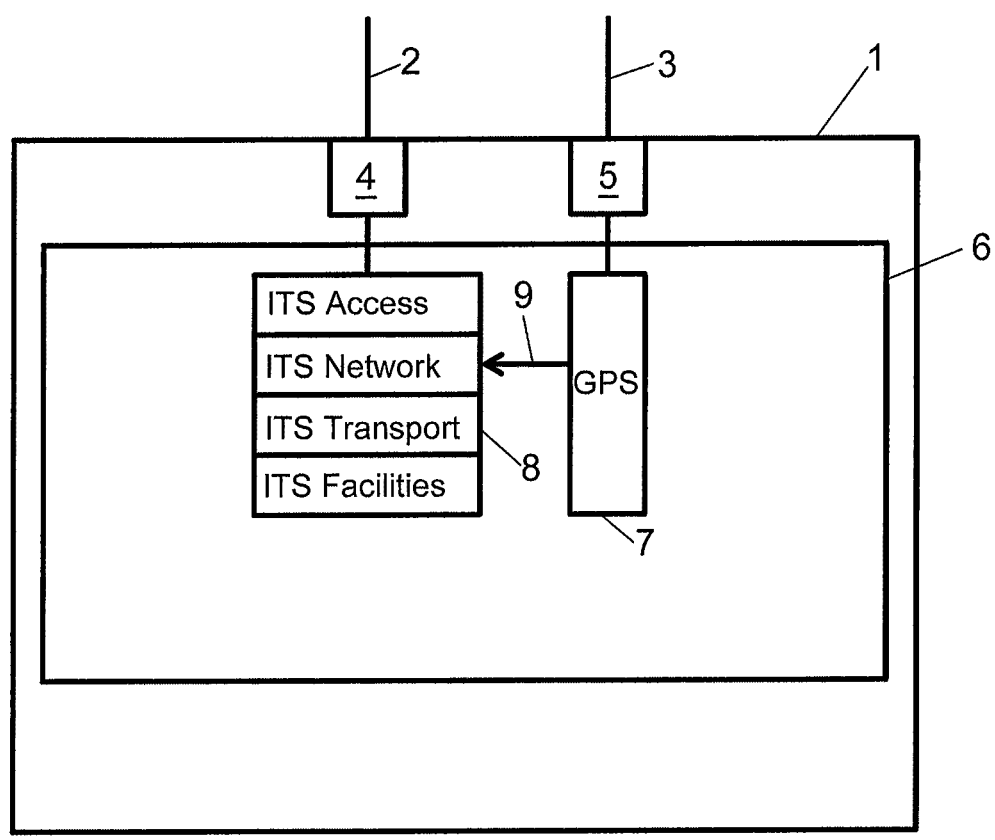
FIG. 1 shows the schematic design of a vehicle antenna unit according to aspects of the invention based on a first embodiment.

FIG. 1 schematically shows a vehicle antenna unit 1 for participation in the vehicle-to-surroundings communication in accordance with the DSRC or ITS-G5 standard with an adhoc network antenna 2 for sending and receiving in a frequency range of 5.9 GHz. The vehicle antenna unit 1 is also equipped with a satellite antenna 3 for receiving satellite locating signals.

Each antenna 2, 3 has associated driver elements 4, 5 for transmitting and/or receiving data or signals using the adhoc network antenna 2 and the satellite antenna 3. The driver elements 4, 5 may be in the form of hardware and/or software elements. In the case of software elements, portions of the driver elements 4, 5 may also be integrated in the computation unit 6 of the vehicle antenna unit 1. According to aspects of the invention, the computation unit 6 is also set up to evaluate the satellite locating signals and for independent participation by the antenna unit 1 in the vehicle-to-surroundings communication (C2X). To this end, the design of the computation unit 6 includes satellite positioning 7 and C2X stack processing 8 for executing a C2X communication protocol stack. The satellite positioning 7 and the C2X stack processing 8 are typically implemented as software in the computation unit 6.

As a result of the satellite positioning 7, the computation unit 6 is set up to use received satellite locating signals to ascertain particularly the vehicle positions, the vehicle speed and the vehicle direction and possibly to make them available to other applications in the computation unit 6. As a result of the C2X stack processing 8, the computation unit 6 is also set up to perform the functions ITS Access, ITS Network, ITS Transport and ITS Facilities in accordance with the layers of the C2X communication protocol stack. The individual functions of the different layers ITS Access, ITS Network, ITS Transport and ITS Facilities have already been explained in detail at the outset. The performance of these functions is realized by a software implementation in the computation unit 6.

In this case, the design of the computation unit 6 includes, between the satellite positioning 7 and the ITS Network layer of the C2X stack processing 8, an internal interface 9 which can be used to input the vehicle positions, vehicle speed and direction of travel from the satellite positioning 7, these being ascertained from the satellite locating signals, directly into the ITS Network layer of the stack processing 8. As a result, this information is available in the course of the C2X communication both for integration into the data messages and for performance of the communication in the manner described previously.

Hence, the vehicle antenna unit 1 has provided an independent subscriber to a C2X communication, said subscriber not requiring connection to other vehicle units in order to participate in a C2X adhoc network. Furthermore, the calculations performed in the computation unit 6 of the vehicle antenna unit 1 are resource saving, as a result of which a comparatively small and inexpensive processor is sufficient for the computation unit 6 in the scope presented in this case. Overall, a vehicle antenna unit 1 which can easily be used in a vehicle and possibly is even easy to upgrade is provided which is available as a network node in vehicle-to-surroundings communication (C2X).

An antenna unit 1 of this kind can be fitted as standard in vehicles in order to facilitate the introduction of the vehicle-to-vehicle communication, even when the vehicle itself has not benefited from the interchanged information in the embodiment of the vehicle antenna unit 1 which is shown in FIG. 1 because said information is not preprocessed.

Figure 2:
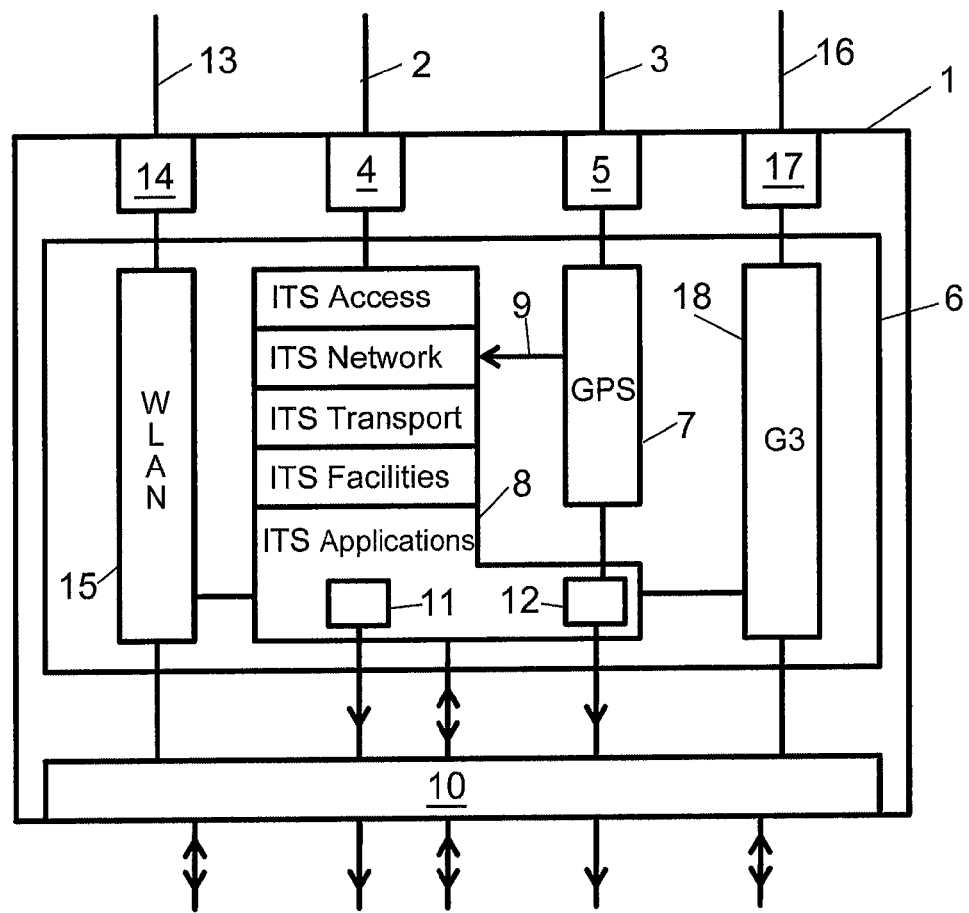
FIG. 2 shows the schematic design of a vehicle antenna unit according to aspects of the invention based on a second embodiment.

FIG. 2 shows a second embodiment of the vehicle antenna unit 1, which will also be denoted by the same reference symbol, since it retains the functionality of the vehicle antenna unit 1 shown in FIG. 1 and has merely been extended by supplementary components and functions. Accordingly, it can be stated that the vehicle antenna unit 1 continues to be set up for and also performs the independent C2X communication via the adhoc network antenna 2, irrespective of what further functions of the vehicle antenna unit 1 are now addressed in connection with further vehicle units. In this respect, reference is made to the above description, the full extent of which is also valid for the vehicle antenna unit shown in FIG. 2.

With regard to the added components and features, it should be noted that the embodiment of the vehicle antenna unit which is shown in FIG. 2 is not intended to be understood to mean that all of these components and functions interact and are understood as an active unit. On the contrary, individual functions and components can also be provided separately from one another in a vehicle antenna unit 1, and there is no compulsion to combine all of these components in an antenna unit 1 according to aspects of the invention.

As an additional component, the vehicle antenna unit 1 shown in FIG. 2 has an interface 10 to other vehicle units, which—as indicated by the arrows in FIG. 2—may be of bidirectional or unidirectional design in the data reading or data outputting direction. In addition, the C2X stack processing 8 in the computation unit 6 has been extended by a layer with the ITS Applications which contains one or more applications, these basically being able to operate independently of one another in combination with an interface 10 of unidirectional design, however.

In this connection, the computation unit 6 may have a filter 11 as part of the C2X stack processing 8 in the ITS Applications layer, said filter being set up to filter the information extracted from the C2X communication and to use the interface 10, which is set up as a data outputting interface, in order to output the filtered information. This information can then be evaluated by downstream vehicle units. In this case, particular provision is made for the filter 11 to filter and forward only such information as does not require any significant post-processing or further processing in downstream vehicle units and, by way of example, can be displayed directly in a display which is present anyway on a man-machine interface. This information may be hazard warnings or reports about speed limits or the like which have been received in the course of the C2X communication. Provided that only this filter application 11 is implemented in the computation unit 6 or the ITS Applications layer of the C2X stack processing 8, it is sufficient for the interface 10 to be of unidirectional design as a data outputting interface.

Irrespective of this, but possibly also together with the functionality described previously, the ITS Applications layer may have vehicle positioning 12 provided in it which receives the position data from the satellite positioning 7 as input data. Further input data can stem from a vehicle sensor unit with vehicle sensors, which preferably capture dynamic states of the vehicle, via the interface, which is in this case in the form of a data reading interface 10. Such sensors may be particularly wheel speed sensors, steering angle sensors, yaw rate sensors or the like. In this case, the vehicle positioning 12 is capable of ascertaining a model-based improvement of the vehicle position in combination with the positioning data from the satellite positioning 7. These data may then be available in the C2X communication via the adhoc network antenna 2.

Provided that both the filter application 11 and the vehicle positioning application 12 are implemented in the computation unit 6, it is advantageous for the interface 10 to be designed as a bidirectional interface, preferably as a standardized vehicle bus interface, so that universal communication with vehicle units, which may be connected to this vehicle bus, is possible. This is indicated by further, bidirectional connections (with the double-headed arrow).

In this connection, it also makes sense for the vehicle antenna unit 1 to be additionally equipped with further types of and opportunities for communication. This may firstly be a WLAN antenna 13 with an appropriate WLAN driver 14, said WLAN antenna being able to be used to perform ordinary WLAN communication on the basis of IEEE 802.11.a/b/g/n. If this is possible and makes sense from a technical point of view, the adhoc network antenna 2 and the WLAN antenna 13 can also be implemented as a combined antenna with a combined driver unit, as a result of which these two antennas are physically in the form of a joint antenna.

The WLAN driver 14 is connected to a WLAN stack processing section 15, which organizes the communication within the context of a conventional WLAN network in a similar manner to the C2X stack processing 8. Particularly at the level of the Applications layer, the WLAN stack processing 15 and the C2X stack processing 8 may be connected to one another. This WLAN connection can be used, for example in a home application, to load relatively large volumes of data (MP3 files or the like) from a domestic WLAN network into a multimedia control unit of the vehicle, which multimedia control unit is connected to the interface 10.

The WLAN connection can also be used to download relatively large volumes of data in the course of C2X communication from another vehicle using a link, for example, the link being able to be transmitted in the course of the adhoc network communication with the antenna 2.

Finally, the vehicle antenna unit 1 may also have a cellular antenna 16 connected to it with a cellular driver 17, in order to be able to use the vehicle antenna unit 1 to participate in ordinary mobile radio communication via public mobile radio networks too. In such a case, the computation unit 6 is additionally equipped with a cellular stack processing section 18, which may also be in contact, in an Applications layer, with the ITS Applications layer of the C2X stack processing

8 for the purpose of data interchange. The interface 10, which is also preferably of bidirectional design in this case, may connect vehicle units using the cellular mobile radio communication to the vehicle antenna unit 1.

Hence, a vehicle antenna unit 1 which can be used universally in the vehicle is proposed which, in addition to its function for use as an antenna unit for vehicle units provided in the vehicle, also participates in the C2X communication independently and without the benefit of the interface 10 as a network node.

LIST OF REFERENCE SYMBOLS

1 Vehicle antenna unit
2 Adhoc network antenna
3 Satellite antenna
4 Driver element for adhoc network antenna
5 Driver element for satellite antenna
6 Computation unit
7 Satellite positioning
8 C2X stack processing
9 Internal interface
10 Interface to other vehicle units
11 Filter
12 Vehicle positioning
13 WLAN antenna
14 WLAN driver
15 WLAN stack processing
16 Cellular antenna
17 Cellular driver
18 Cellular stack processing

The invention claimed is:

1. A vehicle antenna unit in a vehicle for participation in vehicle-to-surroundings communication in accordance with the DSRC or ITS-G5 standard, the vehicle antenna unit including:
  an adhoc network antenna, integrated in the vehicle antenna unit, for sending and receiving data in the region of 5.9 GHz;
  a satellite antenna, integrated in the vehicle antenna unit, for receiving satellite locating signals;
  driver elements, integrated in the vehicle antenna unit, which are set up to send and/or receive data using the adhoc network antenna and the satellite antenna;
  a computation unit, integrated in the vehicle antenna unit, for processing the data; and
  an interface unit, integrated in the vehicle antenna unit, for interfacing the computation unit to other electronic units in the vehicle,
  wherein the computation unit is configured to:
    a) evaluate the satellite locating signals and perform the vehicle-to-surroundings communication without data being exchanged between the computation unit and the other electronic units in the vehicle through the interface unit, and
    b) evaluate the satellite locating signals and perform the vehicle-to-surroundings communication with data being exchanged between the computation unit and the other electronic units in the vehicle through the interface unit.

2. The vehicle antenna unit as claimed in claim 1, wherein the computation unit is set up to use received satellite locating signals to ascertain the vehicle position, the vehicle speed and the direction of travel.

3. The vehicle antenna unit as claimed in claim 1, wherein the computation unit is set up to perform the functions of the ITS Access layer, the ITS Network layer and the ITS Transport layer.

4. The vehicle antenna unit as claimed in claim 1, wherein the computation unit is set up to perform the basic functions of the ITS Facilitates layer.

5. The vehicle antenna unit as claimed in claim 1, wherein the vehicle antenna unit has an interface to other vehicle units.

6. The vehicle antenna unit as claimed in claim 5, wherein the computation unit is set up to filter the information extracted from the vehicle-to-surroundings communication and to use the interface as a data outputting interface in order to output filtered information.

7. The vehicle antenna unit as claimed in claim 6, wherein criteria for filtering the information extracted from the vehicle-to-surroundings communication are prescribable and alterable.

8. The vehicle antenna unit as claimed in claim 5, wherein the computation unit is set up to use the interface as a data reading interface in order to use sensor data which are output by a vehicle sensor unit with vehicle sensors for the purpose of improved ascertainment of the individual vehicle position and to use this improved vehicle position in the vehicle-to-surroundings communication.

9. The vehicle antenna unit as claimed in claim 5, wherein the vehicle antenna unit has a cellular antenna and/or a WLAN antenna, each having driver elements which are set up to send and/or receive data bit by bit.

* * * * *